INVENTORS
CECIL P. ROBERTS
DANIEL D. ACTON
BY
ATTORNEY

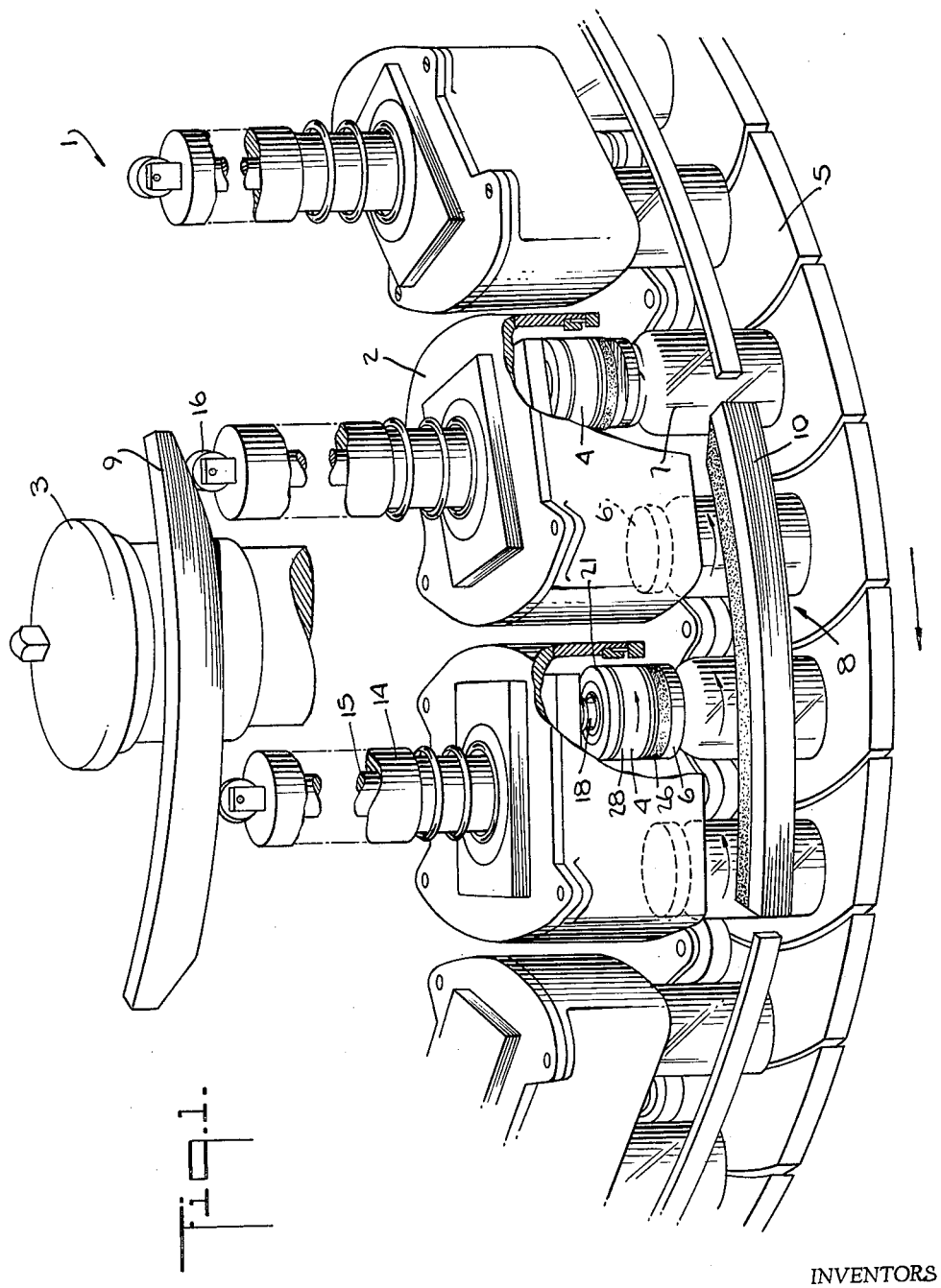

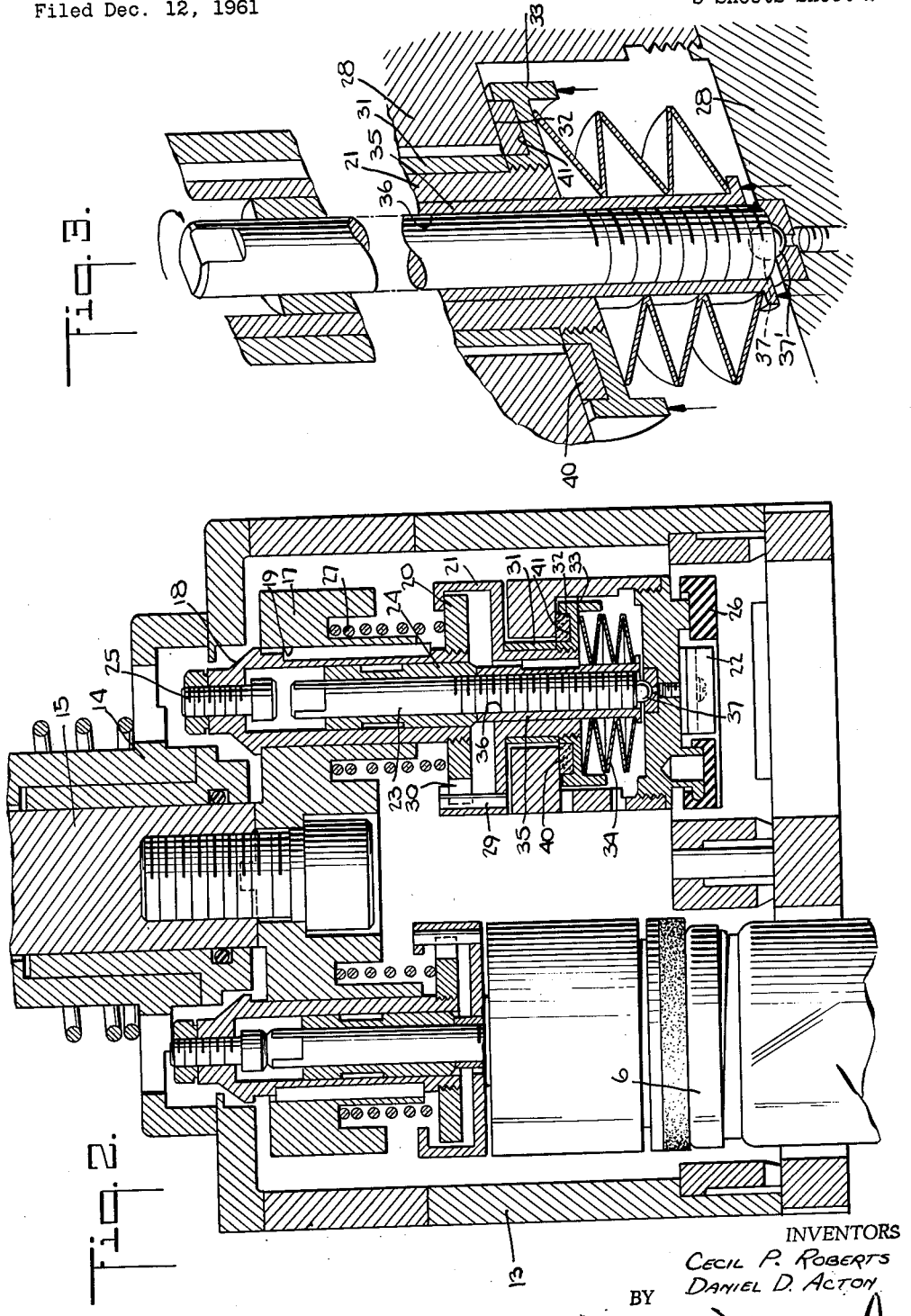

United States Patent Office 3,134,211
Patented May 26, 1964

3,134,211
TORQUE CONTROL MEANS FOR SEALING
MACHINES
Cecil P. Roberts and Daniel D. Acton, Lancaster, Ohio, assignors to Anchor Hocking Glass Corporation, Lancaster, Ohio, a corporation of Delaware
Filed Dec. 12, 1961, Ser. No. 158,806
13 Claims. (Cl. 53—331.5)

The present invention relates to container sealing machines and more particularly to an improved sealing machine sealing head having a torque control which applies closure caps to containers with a predetermined torque.

In sealing containers with screw-type closure caps, the sealing torque must be great enough so that the caps are firmly held on the containers during handling and storage and at the same time the torque must be kept low enough so that the caps may be readily removed by hand. These values of torque are readily determined for each type of cap used and once the range is determined it is desirable that the sealing machines be adjusted and maintained so that a preferred torque value within the range is used on all caps during the entire sealing run.

Although several types of torque control have been used on present machines, these have proven less than satisfactory particularly on high speed vacuum-type sealing machines wherein the containers are passed through at extremely high rates and where the particular containers and caps used have a narrow acceptable torque range between the condition of possible loose or leaking caps and overtight caps which are difficult to remove.

The torque control of this invention provides a precisely valued and readily set cap application torque which remains constant during long sealing runs and through minor variations in both the container and cap size and shape and also through changes in the condition of the closure cap cover surface which is engaged by the sealing head.

Precisely controlled sealing torque such as is obtained by means of the present invention is of great importance in the packaging industry since it enables the packers to overcome what is probably the greatest single objection of consumers to threaded-type closures. This is a difficulty encountered from time to time with screw capped containers in removing the caps. A primary consideration for the packer is that the package contents reaches the consumer in a tightly sealed condition especially where the product is a food product. For this reason where precise sealing torque control has been unobtainable, the packers have tended to apply the caps with torques sufficiently great to insure that all containers are tightly sealed against leakage. This has resulted in many of the closure caps being applied with a force effective to prevent leakage but too great to permit the ready removal of the caps by the consumer. A sealing machine which permits the cap application torque to be precisely controlled permits the packers to set the torque at the desired range and eliminates any need to apply excess sealing torques to overcome random variations in the sealing torque.

Accordingly, an object of the present invention is to provide an improved means for applying threaded-type caps to containers;

Another object of the present invention is to provide an improved torque control for sealing machines;

Another object of the present invention is to provide an improved torque control for the sealing heads of sealing machines;

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the torque control of the present invention on a rotary sealing machine;

FIG. 2 is a vertical sectional view of a sealing head illustrating the torque control of the present invention;

FIG. 3 is a fragmentary perspective view of the torque control illustrating the means for adjusting the torque;

Figure 4:
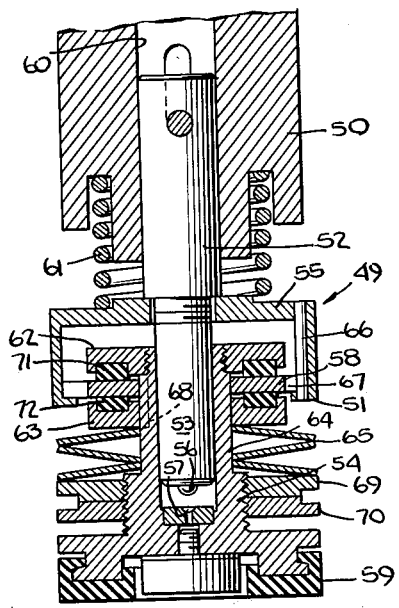
FIG. 4 is a vertical sectional view of another embodiment of the torque control in accordance with the present invention.

The torque control will be described in connection with a rotary sealing machine such as disclosed in patent application Serial No. 840,150, now Patent No. 3,073,909 dated January 15, 1963 owned by the assignee of this invention. This sealing machine will be described only in so far as is necessary to describe the operation of the improved torque control in the sealing machine head.

As illustrated in FIG. 1, the sealing machine 1 has a number of sealing heads 2 mounted for rotation about a central post 3. Each sealing head 2 has a pair of sealing chucks 4 mounted on its lower end and as the sealing heads 2 rotate about the post 3 and above the arcuate conveyor 5, each of the chucks 4 picks up a closure cap 6 from a suitable closure cap supply and carries the cap 6 along an arcuate path above a container 7 seated on the conveyor 5. As the sealing chucks 4 and the containers 7 move through the sealing portion 8 of the sealing machine 1, the sealing chucks 4 are moved downwardly by the sealing cam 9 while the containers 7 are simultaneously rotated by being held against and rolled along the elongated stationary friction shoe 10. This causes a relative rotational motion between the caps 6 and the containers 7 so that the caps are twisted onto the containers 7.

A detailed description of the torque control operating in the above described sealing machine will now be given with particular reference being made to detailed FIGS. 2 and 3 which illustrate the torque control means in detail. In the operation to be described the relative rotational motion is obtained by rotating the container. The torque control described may also be used with a non-rotating container and a rotating chuck or any combination of container and chuck rotation.

There are three important operations which are performed successively as each cap 6 is applied to a container 7.

A first of these is a light initial controlled placement of the cap on the container top so that the cap lugs or threads lightly engage the particular portion of the closure threads beneath the cap threads.

The second operation consists of the relative twisting motion which turns the cap onto the container threads and it is accompanied by a relatively greater downward pressure of the cap lugs or threads against the container threads.

The final operation is the torque control which holds the torque applied between the cap threads and the container threads at a predetermined value so that the cap is applied tightly enough for retention on the container while at the same time being removable by hand by the consumer.

The sealing chucks 4 and their mountings on the bottom of each sealing head 2 provide these three operations as will now be described. The details of the chuck mounting of the preferred embodiment are illustrated in FIGS. 2 and 3.

Each sealing head 2 includes a vertically movable support rod 15 whose position is controlled by the sealing cam 9 and the cam rollers 16. In the preferred embodiment illustrated in FIG. 2, a foot 17 is attached to the bottom of each rod 15 and a pair of chucks 4 are mounted on the opposite ends of each foot 17. Each of the chucks 4 is mounted on a spindle 18 which is slidably contained in a suitable aperture 19 in the foot 17. A hood 13 supported on a sleeve 14 surrounding the rod 15 encloses the foot 17 and the chucks 4 to facilitate the creation of a steam or gas atmosphere about the container top during the sealing.

In order to provide the light initial or floating contact between the cap 6 and the container threads, a floating type of coupling is provided between the chuck 4 and a horizontal flange 20 on the lower end of the spindle 18. Each chuck 4 is coupled to the flange 20 by means of the flanged upper portion 21 which is fitted about the flange 20 for vertical sliding movement. The entire chuck 4 is free under the restraint of gravity to slide upwardly on the flange 20 when a cap 6 held by the support magnet 22 strikes the container threads during the initial downward movement of the rod 15 at the commencement of the sealing operation. This floating movement of the chuck 4 on the flange 20 provides the above described initial cap application to facilitate the registry of cap and container threads no matter what relative position they happen to have with respect to each other. The threaded torque adjusting screw 23 and the related lock nut 24 which will be further described below are slidably mounted within spindle 18 so that they permit the above described floating action.

A float adjustment screw 25 adjustably positioned in the top portion of the spindle 18 determines the final vertical position of the chuck 4 in the initial cap application. This is set to provide the maximum necessary floating motion which can result from any possible relative position of the cap and the container threads.

Further downward movement of the rod 15 under the control of the sealing cam 9 causes the screw 25 to abut the adjustment screw 23 as seen in the lefthand chuck 4 in FIG. 2 and thereafter causes the engagement pressure to be applied between the pad 26 and the cap cover due to upward movement of the spindle 18 on the foot 17 and the compression of control spring 27. This upward movement which is set by the adjustment of the sealing cam 9 forces the resilient pad 26 against the top of the cap 6 as the container threads on the container are turned into engagement with the cap threads due to the rotation of the container.

In order to provide the third important action during cap application which is the above described torque control, the chuck 4 is formed in two separate parts which are the above described upper portion 21 and the lower pad holding portion 28. While the upper portion 21 of the chuck 4 is held against rotation by the locking pin 29 slidably engaging slot 30 in the disc 20, the lower portion 28 is permitted to rotate under the restraining action of the torque control means by being rotatably mounted on the upper portion 21 on the bearing 31.

The torque control means releasably couples the two portions 21 and 28 of the chuck 4 together and sets the final torque which is exerted on each cap during the cap threading operation. In the preferred embodiment as illustrated in FIGS. 2 and 3, the lower portion 28 of chuck 4 has a generally cylindrical top formed with a horizontal friction surface 32 positioned to slidably engage the upper surface of a flange 33 provided on the lower end of the top portion 21 of the chuck 4.

In order to resiliently hold the upper and lower portions 21 and 28 of the chuck 4 together with the upper surface of flange 33 in engagement with the friction surface 32, a torque control spring 34 is mounted in compressed condition between the lower surface of the flange 33 and an adjusting sleeve 35 slidably fitted in aperture 36 in the upper portion 21 of the chuck 4.

The torque adjust screw 23 controls the position of the adjusting sleeve 35 by being rotatably mounted on thrust bearing 37 on the lower portion 28 of chuck 4 and by being threadably connected to the adjusting sleeve 35. The compression applied by the spring 34 provides a vertical force which holds the friction surface 32 and the upper surface of flange 33 of chuck 4 together. Rotation of the screw 23 moves the sleeve 35 to compress or expand the spring 34 as desired. The clutch spring force is independent of both the particular position of the chuck 4 as regards the flange 20 and also the force applied between the cap and the container by the compression of the spring 27. A sealing torque is therefore obtained which is directly controlled by the spring 34 as adjusted by the screw 23 and this torque remains constant through variations in the other related factors in the sealing operation, such as the vertical position of the chuck and the particular force applied to the cap top through the gripping pad 26. In addition, the clutch surfaces are enclosed and thus provide a predetermined torque independently of the external conditions surrounding the container.

In the preferred embodiment illustrated, the torque control spring 34 is a disc type spring also known as a Belleville or Schnorr spring. This type of spring is particularly effective for the torque control as it is capable of extremely fine adjustment which remains constant after being set. This spring also is particularly suitable as it applies a uniform force around the circumference of the flange 33 in a vertical or axial direction. These bellows-type springs are easily capable of providing the degree of compressive force required.

While metal to metal contact may be used on the torque controlling surfaces 32 and the top flange 33, the preferred embodiment has a graphite ring 40 mounted in a suitable slot 41 in the flange 33. The use of a lubricated torque control surface in this manner has been found to provide a more consistent torque value which is constant over long periods. By applying a sufficiently large compressive force by adjustment of the spring 34, the desired braking action is obtained between the graphite ring 40 and the abutting friction surface 32 and when thus set the graphite ring eliminates galling or other wear which cause changes in the torque control value.

The combination of the ball mounting 37 for the pad holding portion 28 and the clearance between bearing 31 and the top of portion 28 (FIG. 3) permit the pad mounting portion 28 to tilt slightly when necessary to accommodate off-level container tops.

The pressure obtained by the compressed spring 34 is exerted between the surface of ring 40 and the ball seat 37'. Friction in the ball seat is added to the friction obtained between rings 40 and portion 28. The use of a ball-shaped seat provides a large area with a small seat diameter. This ball seat 37' and ball 37 provide reduced wear and more resistance differential between ring 40 and portion 28 and ball 37 and ball seat 37' which results in better torque control.

Another embodiment of a sealing head with the improved torque control is illustrated in FIG. 4. In this embodiment, the sealing head 49 is mounted on the bottom of a rotating vertical rod 50 which is driven so that the cap is turned onto a non-rotating container. This embodiment also may be used in a sealing machine where the sealing chuck holds the cap against rotation while the container is rotated as described above.

In this embodiment the chuck 51 is mounted at the bottom of a spindle 52 on an elongated reduced diameter portion 53 which permits the lower portion 54 of the chuck to slide upwardly with respect to the upper portion 55 to provide the initial cap seating action similar to that described above when the cap makes initial contact with the container as the sealing head is lowered towards the container. The lower portion 54 slides upwardly against force of gravity until the thrust bearing 56 on spindle 52 engages its seat 57. The upper portion of the chuck 51 whose sidewalls slidably contain control disc 58 is attached to the spindle 52.

Figure 5:
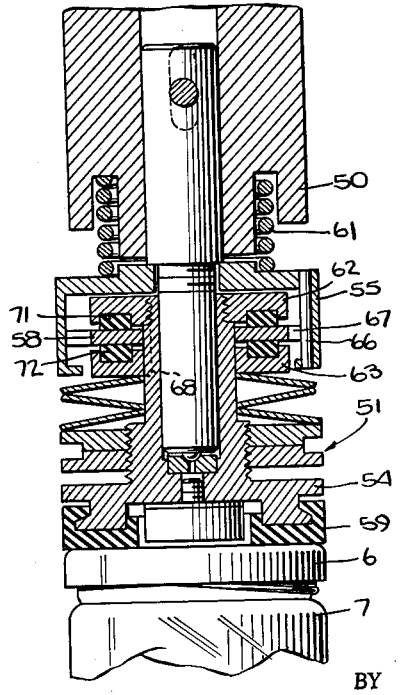
FIG. 5 is a vertical sectional view of the torque control of FIG. 4 applying a cap to a container.

FIG. 5 illustrates the lower portion 54 of the chuck 51 in this raised position. After the bearing 56 has been seated, further downward movement of the rod 50 applies a downward sealing force and cap gripping force between the pad 59 and the cap by causing the spindle 52 to slide upwardly in the aperture 60 at the bottom of the rod 50 against the force of the compressed spring 61 as also illustrated in FIG. 5. In order to control the cap application torque so that the rotating chuck 51 applies a predetermined torque to the cap, a pair of torque control discs 62 and 63 are mounted on the lower portion 54 of the chuck 51 on opposite sides of the control disc 58. The upper torque control disc 62 is fixedly attached to bearing portion 54 while the lower torque control disc 63 and the control disc 58 are slidably mounted on the bearing portion 54. The control disc 58 is held against rotation by the pin 66 and related slot 67 and the lower control disc 63 rotates with the lower portion 54 of the chuck 51 through the intermediation of key 68. These two lower discs 63 and 58 are held against one another and the disc 58 is forced against the upper torque control disc 62 by the compressed torque control spring 65 which is preferably a disc type spring as illustrated. A torque of predetermined value is obtained by compressing the spring 65 by the adjusting nut 69 and by locking nut 69 in position with the lock nut 70. It will be seen from FIG. 5 that the rotation of the lower portion of the chuck is controlled by the operation of the torque control discs 58, 62 and 63 independently of the above described movement of the chuck 51 on the reduced diameter portion 53 of the spindle 52 and of the compression of the spring 61. The lower portion of the chuck thus will rotate the cap 6 until the torque resulting from the engagement of the cap threads and the container 7 threads reaches the preset value and after this point, the lower portion 54 of the chuck together with the torque control discs 62 and 63 will rotate about the reduced diameter portion 53 of the spindle 52. Graphite rings 71 and 72 are mounted on the control discs 62 and 63 to provide the precision control and long life as described above for the torque control of FIG. 2.

It will be seen that the present invention provides a control which maintains a constant cap application torque during a container sealing operation. The torque is independent of the other factors in the sealing operation so that it remains constant through variations in sealing conditions and in container and cap shape. An improved sealing results where the caps are applied tightly enough to prevent leakage while at the same time being easily opened by hand by the consumer. This movement in sealing machines thus eliminates one possible objection to the use of the otherwise highly desirable threaded-type closure caps, i.e., the present difficulty occasionally encountered in opening the containers. The improved control is also adapted for high speed sealing machines as it provides a constant torque value requiring no adjustment over long periods of time.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A sealing head for a sealing machine to apply screw caps comprising the combination of a movable support, a chuck mount movably attached to said support, resilient means urging said chuck mount downwardly, a chuck on said chuck mount, said chuck having a control portion and a cap engaging portion rotatably mounted with respect to said control portion, surfaces of each of said portions being in abutting relationship, resilient means urging said abutting portions against one another, one of said abutting surfaces comprising lubricating material and a thrust bearing for rotatably connecting said chuck mount said said cap engaging portion independently of said abutting portions of said control portion and said cap engaging portion whereby said thrust bearing applies the downward cap sealing force and said abutting portions control the cap rotating force.

2. The sealing head as claimed in claim 1 in which said lubricating material comprises graphite.

3. The sealing head as claimed in claim 1 in which said resilient means comprises a disc type spring.

4. A sealing head for a sealing machine comprising the combination of an arm, a chuck support resiliently and movably mounted on said arm, a chuck slidably mounted on said support, a first stop to hold said chuck in a lower position against the force of gravity, a second stop positioned to arrest movement of said chuck along said support away from said lower position a predetermined distance from the lower position, said chuck having a control portion restrained against rotation on said support and a rotatably mounted cap engaging portion, and resilient means holding abutting surfaces of said portions in sliding relationship.

5. A sealing head as claimed in claim 4 in which one of said portions comprise at least partially graphite including the abutting surface.

6. A sealing head as claimed in claim 4 in which said resilient means comprises a bellows-type spring.

7. A closure applying chuck for screw closures comprising the combination of a control portion, a closure engaging portion, a support for moving said closure engaging portion downwardly against closures, a thrust bearing rotatably connecting said support and said closure engaging portion, torque control means coupling said portions together independently of said bearing comprising abutting surfaces of said portions, and resilient means resiliently urging said surfaces together.

8. The chuck as claimed in claim 7 in which said bearing comprises a ball whereby said portions are permitted to rotate and rock simultaneously with respect to one another.

9. A sealing head for a sealing machine comprising the combination of a chuck support, a chuck slidably mounted on said support, a first stop to hold said chuck in a lower position, a second stop positioned to arrest movement of said chuck along said support away from said lower position a predetermined distance from the lower position, said chuck having a control portion restrained against rotation on said support and a rotatably mounted cap engaging portion, resilient means holding abutting surfaces of said portions in sliding relationship, and a bearing rotatably coupling said portions.

10. The sealing head as claimed in claim 9 in which the abutting surface of one of said portions comprises a low friction non-metallic material.

11. The sealing head as claimed in claim 9 in which the abutting surface of one said portions comprises graphite.

12. A sealing head for a sealing machine comprising the combination of a chuck support, a chuck slidably mounted on said support, a first stop to hold said chuck in a lower position, a second stop positioned to arrest movement of said chuck along said support away from said lower position a predetermined distance from the lower position, said chuck having a control portion restrained against rotation on said support and a rotatably mounted cap engaging portion, resilient means holding abutting surfaces of said portions in sliding relationship, and said second stop comprising a bearing rotatably connecting said cap engaging portion and said chuck support.

13. A sealing head for a sealing machine for applying screw caps with combined downward and rotary forces comprising the combination of a chuck mount, a chuck mounted on said chuck mount, said chuck having a control portion and a cap engaging portion, said cap engaging portion being rotatably mounted with respect to said control portion, surfaces of each of said portions being in abutting relationship, resilient means urging said abutting portions against one another, and a thrust bearing intermediate said cap engaging portion and said chuck mount rotatably connecting them for transmitting the downward sealing force from said mount to said cap engaging portion independently of said resilient means.

References Cited in the file of this patent
UNITED STATES PATENTS

| | | |
|---|---|---|
| 1,888,470 | Risser | Nov. 22, 1932 |
| 2,610,779 | Fouse | Sept. 16, 1952 |
| 3,018,597 | Hohl | Jan. 30, 1962 |